Figure 1:
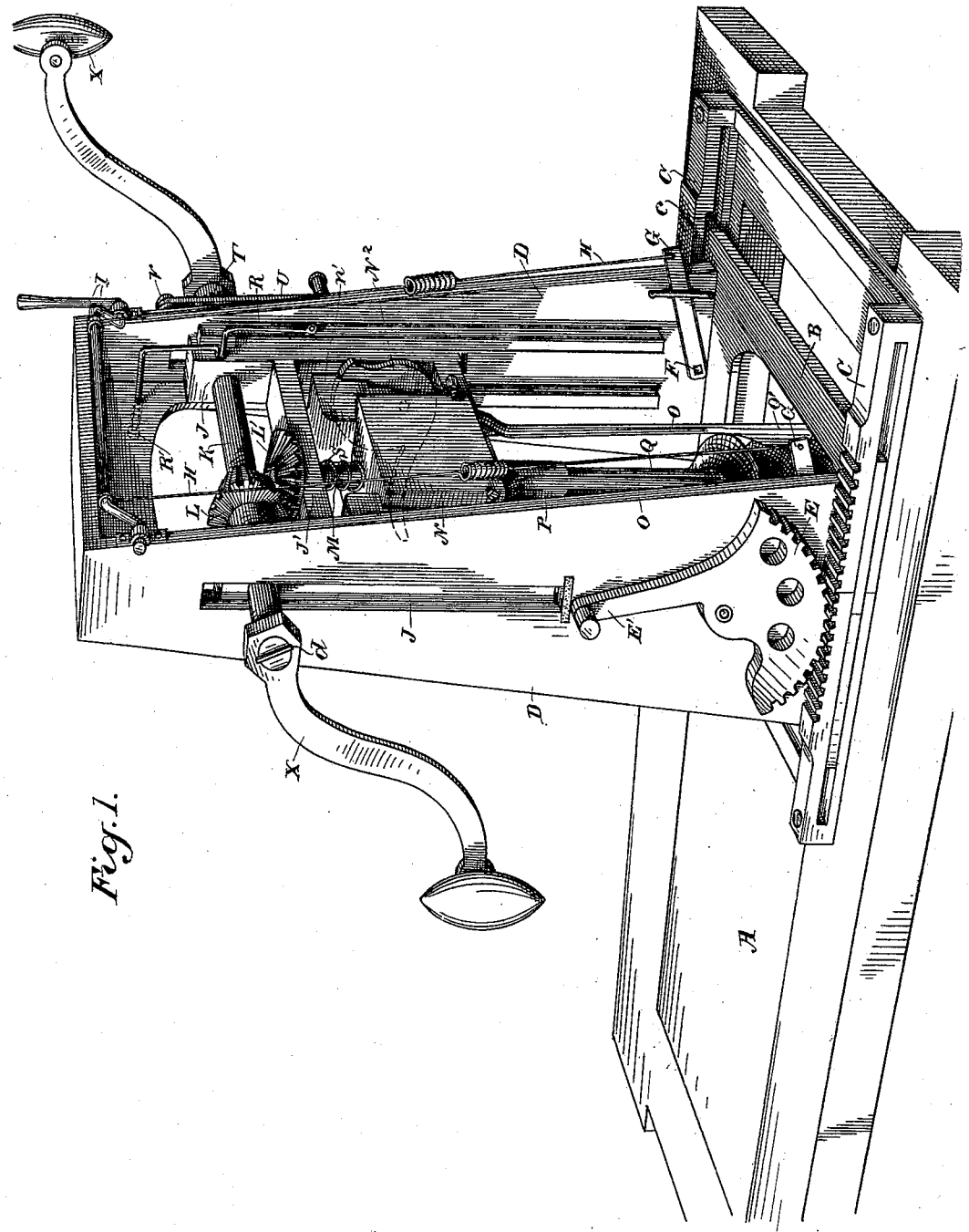

No. 617,473. Patented Jan. 10, 1899.
G. T. PARSLEY & G. C. COTTRELL.
BORING AND MORTISING MACHINE.
(Application filed Aug. 26, 1898.)
(No Model.) 2 Sheets—Sheet 1.

Witnesses,

Inventors,
George T. Parsley
George C. Cottrell
Dewey, Strong & Co.
attys

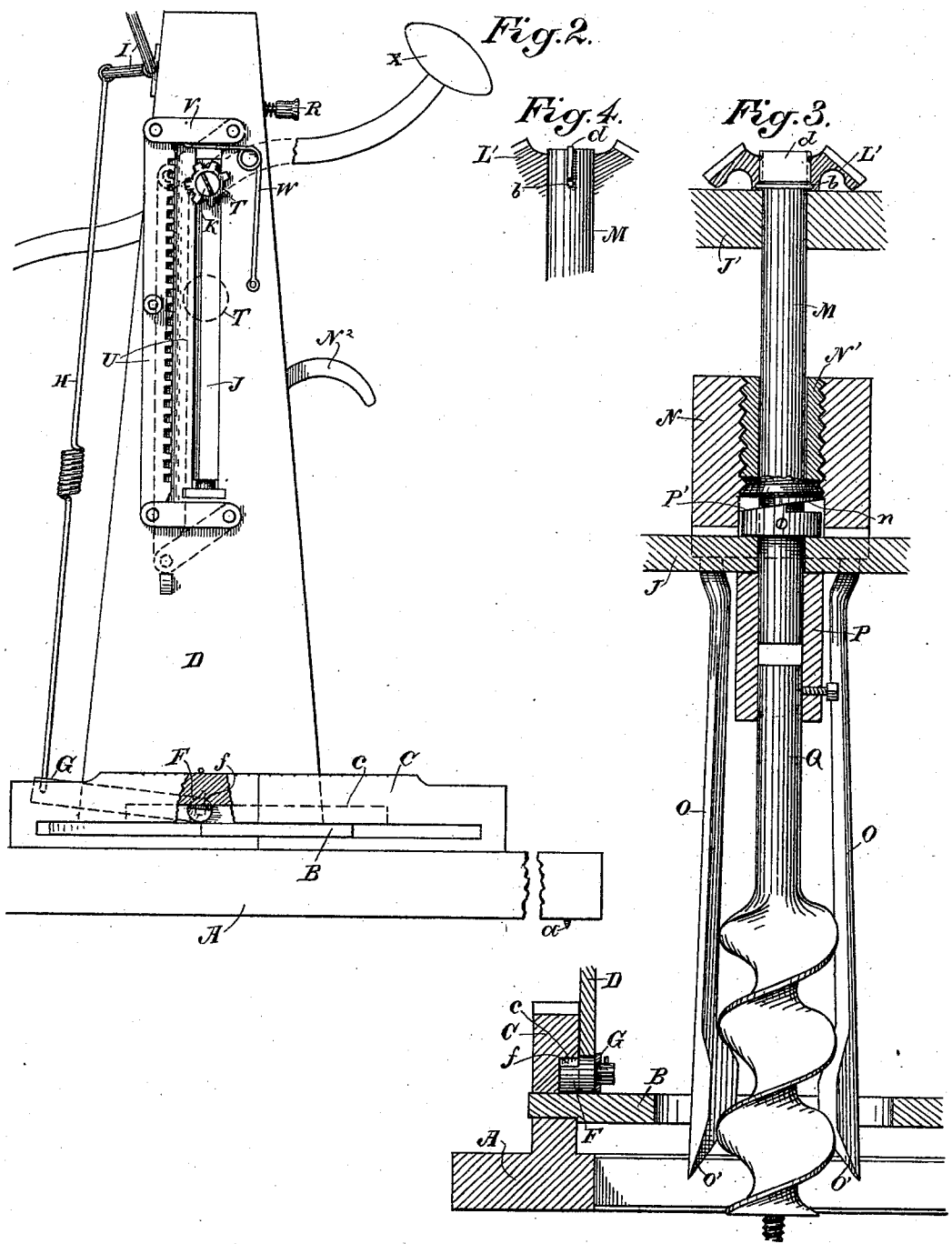

UNITED STATES PATENT OFFICE.

GEORGE T. PARSLEY AND GEORGE C. COTTRELL, OF HORNBROOK, CALIFORNIA.

BORING AND MORTISING MACHINE.

SPECIFICATION forming part of Letters Patent No. 617,473, dated January 10, 1899.

Application filed August 26, 1898. Serial No. 689,562. (No model.)

*To all whom it may concern:*

Be it known that we, GEORGE T. PARSLEY and GEORGE C. COTTRELL, citizens of the United States, residing at Hornbrook, county of Siskiyou, State of California, have invented an Improvement in Boring and Mortising Machines; and we hereby declare the following to be a full, clear, and exact description of the same.

Our invention relates to an apparatus which is designed as a boring or boring and mortising machine combined.

It consists, essentially, in mechanism by which the operations are carried out and in details of construction that will be more fully explained by reference to the accompanying drawings, in which—

Figure 1 is a view of the machine. Fig. 2 is a view of the opposite side of the machine. Fig. 3 is a vertical section through the device which carries the boring-tools. Fig. 4 is a detail section at right angles to Fig. 3 of the top of the boring-shaft.

The object of the invention is to provide an accurate, quick, and serviceable machine by which one or a series of holes may be bored in line with each other independently or in conjunction with a device by which a square or rectangular mortise of any desired length may be accurately made at the same time.

A is the main base or frame, and B is a supplemental base slidable horizontally upon the main frame and movable in guides C, which are fixed to the main frame, as shown, so that the base B can be made to slide along in these guides and adjust it to any desired point or to move it as far as the guides permit. This base B carries the vertical standards D, and upon and between these standards are carried the boring, mortising, and adjusting mechanism, so that when a hole is to be bored at a certain point, the apparatus being placed upon the part to be bored, the frame B is moved to a point to bring the boring-bit in line with the hole to be made, and the hole is then bored.

If a square hole is to be mortised, the mortising-chisels, which are used in conjunction with the boring-bit, are operated, as will be hereinafter described, and the hole mortised. If a mortise of considerable length has to be made, the device is moved after each hole is finished and a continuation of it is made until the full length desired has been finished.

In order to hold the base A properly in place and prevent its moving about and disarranging the work, as well as binding the cutting-tools by such movements, we have shown projecting points $a$ fixed in the bottom of the frame A, so as to engage with the timber upon which the frame is placed, and thus hold the frame firmly in position.

In order to adjust the slidable base B, we have shown the upper edge of one of the guides C having rack-teeth formed upon it, and upon the side of the corresponding standard D is pivoted a segmental gear E, engaging the rack, with a handle $E'$ projecting upwardly, so that it can be turned about its pivot, and this will cause the frame B to advance in either direction, depending upon the amount of movement of the segment.

The frame A, the guides C, and the edge of the slidable base B have lines upon them which may be brought exactly into line with each other, and as the line upon the base B passes exactly through the center of the boring-bit it will be manifest that when these lines are made coincident the hole will be bored exactly as designed.

In order to lock the base B and the parts carried thereby, so that they will not slip out of place, we employ a clutch or locking mechanism, which may be of any suitable or desired description.

In the present case we have shown the guides C having grooves or channels made on their inner faces, as shown at $c$, and pins F are fixed upon lever-arms G, so as to project into the grooves or channels $c$, and pins F pass through the standards D and extend into the grooves or channels $c$. These pins are flattened or cut away on one side, as shown at F, so that when this flattened side lies horizontally the pins are easily slidable in the channels $c$; but when the pins are turned at right angles they will bind in the channels, and thus lock the base B firmly in whatever position it may occupy at the time.

In order to easily operate this device, we have shown the pins F fixed to levers G, of which the pins themselves form the fulcrums. These levers are connected by rods H with a crank-arm I, having a lever or handle by which it is turnable, so as to move the levers G up or down, and thus bind or loosen the clamps. The rods H are preferably made elastic, either by coiling a portion of the wire of which they are composed or by introducing an elastic device of any other description, so that they will always maintain the proper tension to operate the locking mechanism.

The boring-bit and mortising mechanisms are carried in a vertically-slidable frame J, which moves in guides upon the standards D, and the sides of the standards D are vertically slotted to allow the crank-shaft K to pass across the upper part of the frame J, in which it is journaled, and to allow it to move down as far as may be necessary during the operation of boring or mortising. Upon this shaft K is a bevel-gear L, which engages with a corresponding bevel-gear L', fixed upon the upper end of the boring-shaft M. This boring-shaft extends down through the block N, which carries the shanks of the mortising-chisels O, and is turnable loosely through said block.

P is a socket into the upper end of which the shaft M is secured, and into the lower end of this socket the shanks Q of the boring-bits are also secured by set-screws or other suitable means, so that when the shaft M is turned the bit will also be turned, and when the frame J is allowed to move downwardly the bit will bore its way into the timber as far as the travel of the sliding frame J will admit. This frame J is held up whenever desired by a latch R, which is fulcrumed to one of the standards D and which has a push-button or other spring-pressed disengaging device R', so that when the mechanism is being adjusted it is only necessary to raise the frame J, which carries it, until it is engaged by the latch R, where it remains until the adjustment is made. By pressing upon the button R' the latch is disengaged, and the frame J moves downward until the point of the bit rests upon that point where the hole is to be made. If a mortise is to be made at the same time, the shanks O of the mortising-chisels are fitted into sockets in the lower part of the block N, so that the mortising-chisels inclose the boring-bit. These chisels are made angular, as shown at O', so that their edges project toward each other and are approximately tangent with the periphery of the bit, and when these chisels are reciprocated vertically, following the hole which is being bored by the bit, they will cut out the angles so as to make a rectangular mortise. The shanks O of the chisels are bent where they enter the sockets N, so that different chisels may be used for boring-bits of different diameters, and any size boring-bit within the capacity of the machine will have a set of mortising-chisels corresponding with it, so that any size of mortise can be readily made by the use of the proper bit and corresponding chisels.

In order to reciprocate the chisels while the boring is going on, the block N, through which the shaft M passes loosely, is vertically movable upon guides interior to the frame J, and by means of a spring S, the lower end of which presses upon the top of the block and the upper end against a cross-bar J' of the frame J, a continuous pressure is brought upon the top of the block N.

In order to reciprocate the block N while the boring-bit is being rotated, above the upper end of the socket P is formed a cam P', at the shaft M.

N' is a screw-plug fitting into threads in the top of the block N, and its lower face has a cam $n$ coincident with the cam P'.

The screw-plug N' is screwed into the top of the block N and secured by a set-screw or other means, so that its lower cam-shaped end $n$ is pressed into contact with the corresponding cam-shaped end P'. Now when the bit is being turned it rotates the cam P', and engaging the cam $n$, will raise the block N until the offsets of the two cams are brought in line, when the spring S will act to force the block N downward as far as the height of the offsets allow, and this will cause the chisels O' to strike with sufficient force to mortise out the corners of the hole made by the bit as fast as the latter advances. In this way the mortise may be made as deep as desired, and after it is completed the frame J is raised and latched by the pawl R. The sliding base B is then advanced as far as is necessary to bore a new hole and continue the mortise, and so on until the mortise has been made as long as may be desired or as the apparatus will permit.

If it is desired to bore without mortising, the mortising-chisels are removed, and the block N, with its cam-plug N', is raised so that the cam-faces do not engage, and the block N will then not reciprocate. This raising of the block is effected by a cam-lever $N^2$, fulcrumed upon one side of the sliding frame J and adapted to engage with a suitable lug or projection $n'$, carried by the block N, so that by the movement of the lever $N^2$ the block N can be raised against the tension of the spring S sufficiently to prevent the engagements of the cams $n$ P'. The boring will then take place without any reciprocating movement of the block.

After a hole has been bored or a mortise completed and it is desired to raise the cutting apparatus it is effected by means of a pinion T, fixed upon the crank-shaft K, and a movable rack-bar U, which is so mounted upon the standards D that it can be thrown into or out of mesh with the pinion T. While work is progressing, this rack U is out of contact with the pinion T, and the shaft K moves down in unison with the movements of the sliding frame J as the hole progresses. When it is desired to raise the apparatus, the rack U is thrown into contact with the pinion T, and the continued revolution of the crank-shaft causes the pinion to roll up along the rack U until it reaches the top, and when this occurs it will be engaged by the pawl R and retained at this point.

In order to so mount the rack U that it can be easily thrown into or out of engagement with the pinion T, we have shown the upper and lower ends of the rack as pivoted to horizontal arms V, the opposite ends of which are pivoted to the standard D, and when the rack U is pushed downward it moves like an arm of a parallel ruler about the pivot-points of the arms V until its teeth are brought into contact with the pinion T, and the latter will then roll up along the teeth of the rack until it reaches the top. A spring W presses upon the arm V, and the normal tendency when relieved of the weight of the frame J is to raise the arms into horizontal position and thus throw the rack U out of mesh with the pinion T. The rack U is drawn down by any suitable knob or handle, and when it is engaged with the pinion T the weight of the sliding frame J and its appurtenances will retain the two in mesh against the action of the spring W. As soon, however, as the pinion T has reached the top of the rack U it arrives at a point where there are no engaging teeth on the rack, and the latter is then disengaged and moved by its spring W, so as to throw the rack out of mesh with the pinion T at the instant when the pawl R has engaged the frame J to prevent its again dropping after the rack is disengaged.

In order to removably attach the cranks X to the shaft K and also to similarly attach the pinion L' to the shaft M, the ends of the shaft are slotted and a pin $d$ passes through the inner end of the slot, extending beyond the shaft at each side, and it fits in corresponding sockets or grooves made in the inner faces of the cranks, so that it serves as a stop to determine the distance to which the parts are moved onto the ends of the shaft.

$d$ is a wedge-shaped key which fits into the slotted end of the shaft and which when driven in spreads the shaft sufficiently to make it bind tight within the opening in the part which is attached to the shaft. This key is a little wider than the diameter of the shaft and enters corresponding slots or keyways made inside the part which is attached to the shaft, and thus serves to prevent its turning upon the shaft, while the spreading of the shaft prevents any side play.

Having thus described our invention, what we claim as new, and desire to secure by Letters Patent, is—

1. In an apparatus of the character described, the combination, of a main frame, a supplemental base having standards upon which the operative mechanism is mounted, guides fixed to the main frame and within which the supplemental base is slidable, and means for locking the said base including lever-arms on the inner sides of the standards, and having fulcrum-pins fixed to their inner ends and projecting laterally through the standards, and into grooves in the guides, and means connecting the outer ends of the levers whereby they operate in unison to engage and disengage the locking devices.

2. In an apparatus of the character described, a main frame with means for holding it in position, horizontal guides fixed thereon, a supplemental base carrying standards and operative mechanism and slidable within the guides, and locking devices including lever-arms at opposite sides of the base and having rigid fulcrum-pins projecting at right angles therefrom and passing through the standards and engaging the guides; said pins flattened on one side and said levers connected so that they move in unison, whereby said base may be secured at any point of adjustment, rack-teeth upon one of the guides, a toothed segment pivoted to the movable base and standard with its teeth engaging the rack-bar whereby the apparatus may be moved and adjusted upon the main frame.

3. In an apparatus of the character described, a main frame, a supplemental base horizontally adjustable thereon, standards with vertical guides, a frame slidable in said guides, a crank-shaft journaled across said frame, a vertical boring-shaft and intermediate gears by which motion is transmitted from the crank-shaft thereto, a socket in which the boring-shaft and the bit-shanks are fixed, a block guided and vertically movable in the frame which carries the boring mechanism, mortising-chisels inclosing the bit and carried by said block, means for reciprocating the block, and means for holding the block stationary and out of operating-contact with the boring-shaft when no mortising is to be done.

4. In an apparatus of the character described, vertical standards, a frame slidable therein, a horizontal crank-shaft and a vertical boring-shaft journaled in said frame with intermediate gears by which motion is transmitted from the crank-shaft to the boring-shaft, a socket fixed to the lower end of the boring-shaft and adapted to receive the shank of a boring-bit which is secured in its lower end, a spring-pressed block slidable within the frame and through which the boring-shaft and bit-socket turn loosely, a cam formed upon the upper end of the bit-socket, a screw-plug fitting into the top of the slidable block having a corresponding cam formed on its lower end to engage the cam of the bit-socket whereby the alternate pressure of the cam and the spring act to reciprocate the block.

5. In an apparatus of the character described, a main frame, a supplemental adjustable base, with vertical standards and guides, a frame slidable in said guides carrying the crank and boring-shaft as shown, a spring-pressed block slidable upon guides in said frame and having sockets in its angles, mortising-chisels the shanks of which fit said sockets and the blades inclose the boring-bit which extends downwardly between them, a cam mechanism by which the block is raised by the rotation of the boring-shaft and released and forced downward by the action of the spring, and a cam-lever fulcrumed to the frame and engaging the block to raise it and disengage the reciprocating cams whereby the block remains stationary when no mortising is to be done.

6. In an apparatus of the character described, a main frame, a supplemental base with standards and vertical guides and mechanism whereby it is adjustable with relation to the main frame, a frame slidable in the vertical guides with boring and mortising mechanism carried thereby and adapted to gradually move downward as the work progresses, a pinion fixed upon the crank-shaft and a vertically-disposed rack-bar supported upon the standards and pivoted horizontal levers connected with said bar whereby it is adapted to be brought into engagement with the pinion, so that the continued rotation of the crank-shaft raises the boring or mortising mechanism to the top, and an automatic latching mechanism by which the sliding frame is engaged and held at said point.

7. In an apparatus of the character described, standards having vertical guides, a frame slidable therein, boring and mortising mechanism carried upon said frame, a pinion carried by the crank-shaft, a vertically-disposed rack-bar pivoted to horizontal levers at opposite ends whereby it may be moved into or out of engagement with the pinion and a spring by which it is normally held out of said engagement.

In witness whereof we have hereunto set our hands.

GEORGE T. PARSLEY.
GEORGE C. COTTRELL.

Witnesses:
GEORGE D. BUTLER,
ALICE O'NEILL.